Sept. 15, 1936.  A. ABRAMS ET AL  2,054,114
METHOD OF FORMING FLEXIBLE SELF SUSTAINING SHEET MATERIAL
Filed Sept. 16, 1935   3 Sheets-Sheet 1

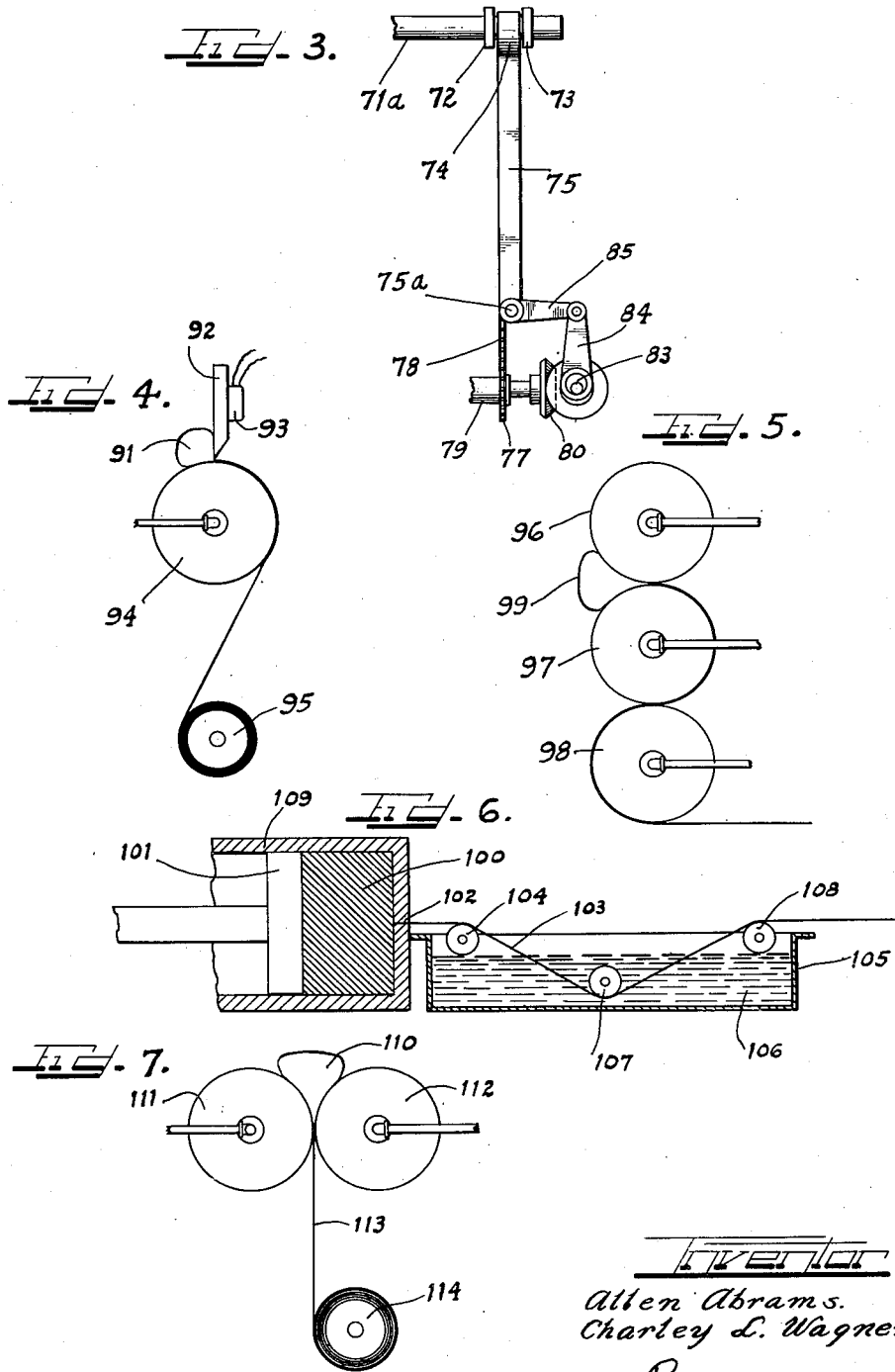

Patented Sept. 15, 1936

2,054,114

UNITED STATES PATENT OFFICE 2,054,114

METHOD OF FORMING FLEXIBLE SELF-SUSTAINING SHEET MATERIAL

Allen Abrams and Charley L. Wagner, Wausau, Wis., assignors to Marathon Paper Mills Company, Rothschild, Wis., a corporation of Wisconsin Application September 16, 1935, Serial No. 40,764

8 Claims. (Cl. 18—57)

This invention relates to an apparatus for and to a method of forming thermoplastic sheet material, and particularly to the manufacture of self-sustaining sheet or film material from mixtures of rubber and rubber-like substances and a wax, or waxy substances.

In copending application entitled "Sheet or film forming or coating composition and a method of preparing the same", Serial No. 693,740, filed October 16, 1933, there is disclosed a method of dissolving rubber, or rubber-like substances, in a wax, or wax-like substances, to form compositions having relatively high viscosities and adapted for use both as coating compositions and also for the formation of self-sustaining sheets or film material. The present invention contemplates the provision of means for and a method of preparing flexible, self-sustaining sheets or films from thermoplastic compositions similar to those described in said pending application and also in copending application Serial No. 40,765 September 16, 1935 executed of even date herewith.

We have found for example that mixtures of rubber and wax, when prepared in certain proportions and under certain conditions to give mixtures of relatively high viscosities, can be made into self-sustaining sheets or films that have desirable heat sealing properties and may be used for sealing purposes or for wrapping purposes. Properties that make our sheet or film material especially valuable for wrapping purposes are its pliability and stretchability and its moistureproofness, waterproofness, gasproofness and heat sealing qualities. Sheets or film of our material are, furthermore, comparatively transparent. Our material can also be readily colored to give pleasing and attractive wrappings and may be made opaque.

We have found that rubber-wax compositions of suitable viscosity can be converted directly into sheets or films in a continuous manner, without the use of volatile solvents, by means of apparatus that we have developed. Owing to the high viscosity and strongly adhesive character of rubber-wax mixtures of a type suitable for conversion into sheet or film form, we have experienced considerable difficulty in devising a machine for and method of forming sheets or films of this material of the desired thinness and uniformity.

It is therefore an important object of this invention to provide an apparatus for and a method of forming thermoplastic sheet material of a relatively thin, self-sustaining flexible character and adapted for use for wrapping and sealing purposes.

It is a further important object of this invention to provide an apparatus capable of forming thermoplastic material into self-sustaining sheets or films of uniform thickness and having smooth surfaces.

It is a further important object of this invention to provide apparatus including a chilled forming means and a heated doctor means, with means for accurately adjusting the distance between said means to draw thermoplastic material into sheets or films of uniform thickness and having smooth surface characteristics.

It is a further important object of this invention to provide a method of forming relatively transparent, thin self-sustaining, heat sealing sheet or film material from compositions of a rubber or rubber-like substance and a wax or wax-like substance, the sheet or film material having excellent moisture-proofness and being particularly adapted for the wrapping of articles where these qualities are required.

It is a further important object of this invention to provide a method of making thin, flexible, self-sustaining sheet or films from rubber-wax compositions containing vulcanizing agents, whereby a vulcanized sheet or film can be obtained having increased stability toward the action of oxygen, light and rubber solvents.

Other and further important objects of this invention will be apparent from the disclosures in the specification and the accompanying drawings.

This invention is illustrated in the drawings and hereinafter more fully described.

On the drawings:

Figure 3 is a detail view of the actuating means for the scraper bar.

Figure 4 is a diagrammatic side elevational view of another apparatus suitable for forming films or sheets from our composition.

Figure 5 is a diagrammatic side elevational view of a calender for forming our composition into films.

Figure 6 is a diagrammatic side elevational view partly in section of an extruding device for forming films from our composition.

Figure 7 is a diagrammatic side elevational iew of two squeeze rolls for converting our composition into sheets.

Figure 1:
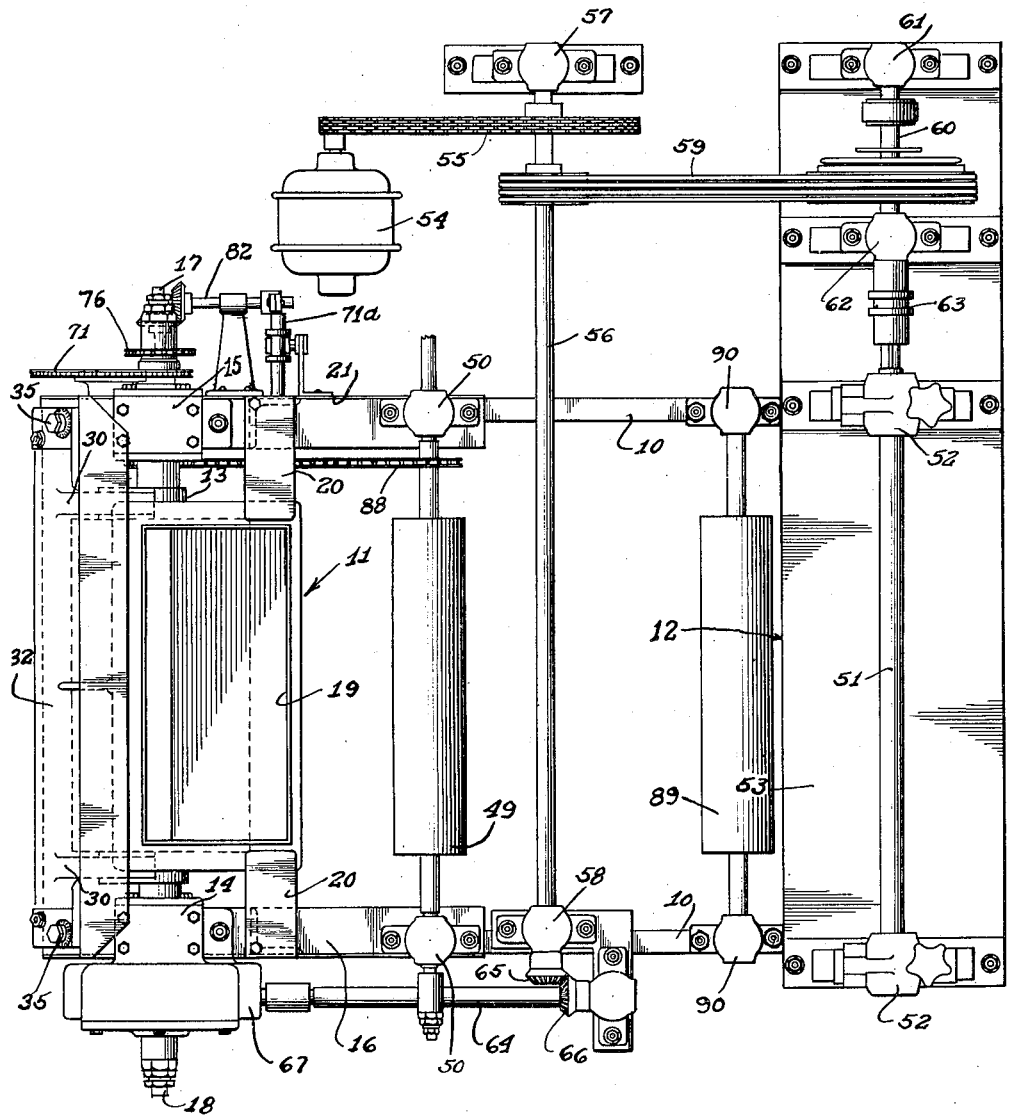
Figure 1 is a top plan view of our preferred apparatus embodying our invention.

We have found that it is possible by adding suitable binders under controlled conditions to certain thermoplastic substances which are brittle and not flexible at ordinary temperatures to render such thermoplastic substances pliable and flexible to a remarkable degree. We have, for example, discovered that substances such as paraffin wax or asphalt which are brittle and not flexible at ordinary temperatures can be rendered pliable and flexible by adding thereto certain binders such as rubber, gutta percha, Vispronal (a straight hydrocarbon produced by suitably polymerizing some of the unsaturated hydrocarbon gases produced in cracking petroleum) and similar binding agents.

We have also found that by properly controlling the proportions and compounding conditions, we can uniformly produce compositions having a desired predetermined viscosity and cohesiveness whereby they can be employed for conversion directly into self-sustaining sheets or films.

The major ingredient or body of our composition thus consists essentially of a thermoplastic substance which is not flexible or pliable at ordinary temperatures. Such body substance is furthermore solid at normal temperatures, but liquefies at higher temperatures, is insoluble in water and acts as a dispersing medium or solvent for the binder which is added thereto. Any substance having the aforementioned properties can be used for our invention, as, for example, paraffin wax, beeswax, spermaceti, asphalt, etc.

The binder which we add to our body portion is thermoplastic, insoluble in water and solid at ordinary temperatures. It is furthermore elastic, flexible and has strong adhesive properties. It is dispersible or soluble in the body portion. Any natural or synthetic substances having the aforementioned properties may be used as our binder, as, for example, rubber, balata, gutta percha, Vispronal or other artificial gummy or rubber-like substances.

By properly compounding these substances in suitable proportions and under carefully controlled conditions so as to produce the proper viscosity hereinafter more fully described we have obtained compositions which have distinctly new properties and which have important commercial uses.

Our inventive concept may be illustrated more specifically in considering a thin sheet of paraffin wax. This sheet is brittle, lacks tensile strength and readily breaks upon slight bending. On account of these properties it is therefore not possible to make ordinary paraffin-wax into thin self-sustaining continuous sheets or films and to roll them tightly into a compact package. By the addition to the paraffin-wax of a small proportion of a binder, such as rubber, under properly controlled compounding conditions, we have been successful in producing thin, continuous, flexible, non-tacky, self-sustaining films or sheets from the paraffin-wax. Such sheets can be rolled up tightly into compact rolls for subsequent use as desired.

A specific embodiment of our composition adapted for direct conversion into flexible sheets or films comprises a composition of rubber, or a rubber-like substance and a wax, or wax-like substance. Suitable rubber and rubber-like substances include pale crepe rubber, smoked sheet rubber, vulcanizable rubbers generally, gutta percha and Vispronal, singly or in combination with one another. We have successfully used paraffin wax, beeswax, spermaceti, and other waxes, in the preparation of our composition, singly or in combination with one another. However, pale crepe rubber and paraffin wax are the ingredients which we prefer to use, for producing a substantially colorless and tasteless product. The proportion of pale crepe rubber to paraffin wax may, in general, vary between 6% rubber, 94% paraffin wax and 30% rubber, 70% paraffin wax by weight.

Figure 2:
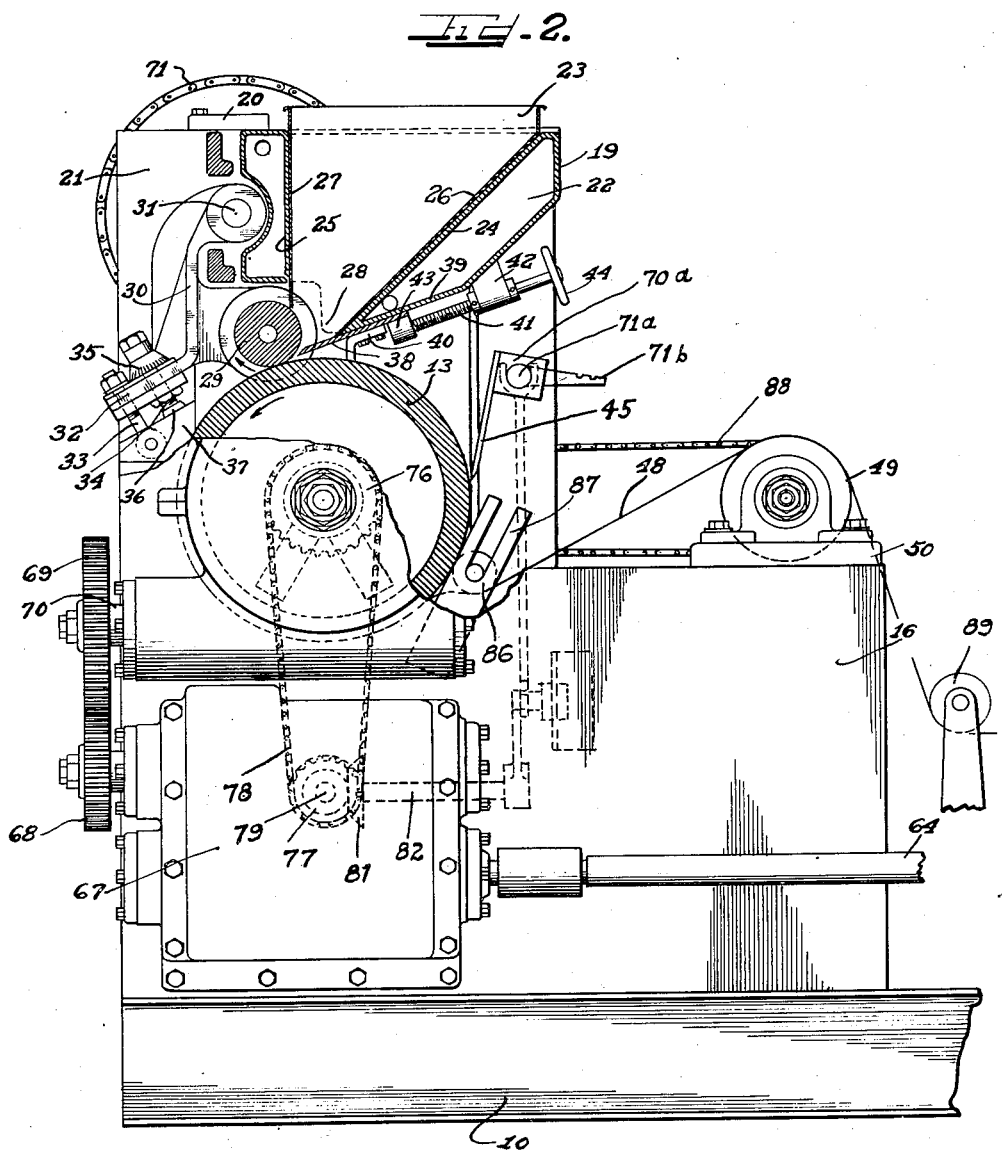
Figure 2 is an enlarged and elevational view, partly broken away and partly in section.

In forming sheets or films from this composition we prefer to use the apparatus illustrated in Figures 1 and 2. The reference numeral 10 indicates a pair of spaced girders, or supports, on which are mounted various elements of our machine, including a film forming device indicated generally by the reference numeral 11 and a roll winding stand 12. The film forming device 11 comprises a forming roll 13, the ends of which are suitably journaled in bearings 14 and 15 secured to framework 16 that is mounted on the support 10. Said forming roll 13 is hollow for receiving a cooling fluid and for this purpose is provided with hollow trunnions into which extend pipes 17 and 18 for the circulation of a cooling fluid.

A jacketed hopper 19 is mounted above the forming roll 13 by means of brackets 20 secured to upstanding frame members 21. Said hopper 19 is provided with a chamber 22 between the spaced inner and outer walls thereof to permit the circulation therethrough of a heating fluid, such as hot water or steam. A liner or shell 23 fits within the hopper 19 and may be easily removed therefrom when the machine is not in operation. The liner may be made of thin gauge sheet metal so as to be light and inexpensive.

A specific embodiment of our composition adapted for direct conversion into flexible sheets or films comprises a composition of rubber, or a rubber-like substance and a wax, or wax-like substance. Suitable rubber and rubber-like substances include pale crepe rubber, smoked sheet rubber, vulcanizable rubbers generally, gutta percha and Vispronal. We have successfully used paraffin wax, beeswax, spermaceti, and other waxes, in the preparation of our composition. However, pale crepe rubber and paraffin wax are the ingredients which we prefer to use, for producing a substantially colorless and tasteless product. The proportion of pale crepe rubber to paraffin wax may, in general, vary between 6% rubber, 94% paraffin wax and 30% rubber, 70% paraffin wax by weight.

In forming sheets or films from this composition we prefer to use the apparatus illustrated in Figures 1 and 2. The reference numeral 10 indicates a pair of spaced girders, or supports, on which are mounted various elements of our machine, including a film forming device indicated generally by the reference numeral 11 and a roll winding stand 12. The film forming device 11 comprises a forming roll 13, the ends of which are suitably journaled in bearings 14 and 15 secured to framework 16 that is mounted on the support 10. Said forming roll 13 is hollow for receiving a cooling fluid and for this purpose is provided with hollow trunnions into which extend pipes 17 and 18 for the circulation of a cooling fluid.

A jacketed hopper 19 is mounted above the forming roll 13 by means of brackets 20 secured to upstanding frame members 21. Said hopper 19 is provided with a chamber 22 between the spaced inner and outer walls thereof to permit the circulation therethrough of a heating fluid, such as hot water or steam. A liner or shell 23 fits within the hopper 19 and may be easily removed therefrom when the machine is not in operation. The liner may be made of thin gauge sheet metal so as to be light and inexpensive. The provision of a liner, which may be readily removed and another one substituted, saves the time that would be involved in cleaning the hopper between successive runs on the machine of differently colored compositions.

The hopper 19 is formed with vertical side walls and at least one sloping wall, such as the wall 24, which with the opposite wall 25 provides a lower opening, through which the corresponding walls 26 and 27 of the shell 23 extend. The liner walls 26 and 27 terminate above the forming roll 13 to provide an opening 28 for the discharge of material from the liner 23.

A heated doctor roll 29 is mounted adjacent the opening 28 in close proximity to the lower edge of the liner wall 27 and to the surface of the forming roll 13. In order to provide for adjustability of the doctor roll 29, said roll is supported at its ends upon brackets 30 which are pivotally mounted about pins 31 extending inwardly from the side frame extension 21. Said brackets 30 are each provided with offset portions 32 having bifurcated ends for the reception of swinging bolts 33. Each of the offset portions 32 is also drilled to receive bolts 34 having micrometer adjusting heads 35. The ends of said adjusting bolts 34 carry disc feet 36 adapted to bear against permanent abutments 37, which are either formed integrally with or secured to the frame extensions 21. The swing bolts 33 are pivotally secured to said abutments 37.

As is obvious, the micrometer adjusting bolts 34 permit the doctor roll 29 to be adjusted so as to give any desired clearance between its surface and the surface of the chilled forming roll 13. When it is necessary to clean the doctor roll 29, the nuts on the ends of the bolts 33 may be removed and the brackets 30 swing upwardly about their pivot pins 31.

In order to produce smooth films or sheets, it is necessary that the surfaces of the forming roll 13 and the doctor roll 29 be perfectly smooth. These rolls should be made of sufficiently hard metal to withstand scratching or abrasion by any foreign particles in the composition fed thereto. The doctor roll 13 may be slightly crowned in order to compensate for any springing of the roll when the film is being formed.

The opening 28 of the hopper liner 23 is controlled by an adjustable closure comprising a slidable plate 38 movable between the lower wall 39 of the hopper 19 and a parallel, transversely extending plate 40 secured to the end frame extension 21. An adjusting mechanism is provided for the plate 38, comprising a threaded shaft 41 passing through a bracket 42 secured to the hopper 19. The threaded end of the shaft 41 is rotatably held within a lug or boss 43 formed on the outer end of the plate 38. The other end of the shaft 31 is provided with a wheel or handle 44 to facilitate manual operation of the adjusting device.

The plate 38 thus forms a continuation of the bottom wall 39 of the hopper 19 and serves to regulate the flow of plastic material from the hopper liner 23 to the forming roll 13. Together with the doctor roll 29, the plate 38 controls the flow of the thermoplastic material to the forming roll and therefore the thickness of the ultimate film of the material. In operation, the edge of the plate 38 is spaced from both the surface of the doctor roll 29 and also the surface of the forming roll 13 to permit the thermoplastic material to flow into the nip between the doctor roll 29 and the forming roll 13. The distance between these two rolls determines the thickness of the film that is formed on the surface of the forming roll 13.

A scraper bar 45 is held against the surface of the forming roll 13 and is oscillated to and fro along the axis of roll 13 by means shown in Figures 2 and 3. The scraper bar 45 serves to maintain the periphery of the forming roll 13 free from dirt or particles in the sheet forming material and also serves, when starting the machine in operation, to facilitate the removal of a film of the sheet forming material from the surface of the forming roll. The scraper bar 45 contacts the surface of the forming roll 13 at a point beyond the point at which the film 48 leaves the forming roll. The scraper bar 45 is carried by brackets 70a to which is attached shaft 71a having collar sleeves 72 and 73 at one end thereof. A yoke 74, on the end of arm 75 of the L-shaped rocker arm 75, 85 pivoted at 75a, is adapted to engage the sleeves and thereby move shaft 71a to and fro which, in turn, moves the scraper bar 45 along the axis of roll 13. In order to actuate shaft 71a sprocket 76 on the shaft of the forming roll 13 drives a sprocket 77 on shaft 79 by means of a chain 78. Shaft 79 carries a gear 80 which meshes with a bevel gear 81 on the end of shaft 82. The other end of the shaft 82 carries an eccentric 83 to which is attached link 84. This link is pivoted to one end of arm 85 of the L-shaped rocker arm 75, 85 thereby transmitting the oscillating motion to shaft 71a. Handle bars 71b are attached to shaft 71a whereby the scraper may be held manually against the roll 13 or weights may be applied to the end of the handle bars in order to constantly maintain the scraper bar against the roll 13.

In order to assist the stripping of the film from the forming roll 13 a stripping roller 86 is provided loosely journaled in an open U-shaped yoke bearing 87 so that it rides on the film 48 as it leaves the forming roll 13. The film 48 then travels over a roller 49, driven by sprocket 88 and supported in bearing brackets 50 from the side walls of the frame 16. The film 48 then passes under roll 89 supported in bearing brackets 90, to a winding reel comprising a driven shaft 51 supported in bearing clamps 52 upon a supporting stand 53. The film or sheet material 48 is wound up upon cores (not shown) secured on the winding shaft 51 in a conventional manner.

The driving mechanism for the machine comprises a motor 54 suitably connected, as by means of gears and a silent chain drive 55, to a main shaft 56. Said shaft 56 is supported at its ends in bearings 57 and 58. A drive connection 59 connects the main shaft 56 with a countershaft 60 for driving the winding shaft 51. Said countershaft 60 is mounted in bearings 61 and 62 in alignment with the winding shaft 51 and is adapted to be connected thereto by means of a clutch 63.

The main shaft 56 is also geared to a shaft 64, as by means of the miter gears 65 and 66 for connection through the reducing mechanism, indicated generally at 67, and by means of gears 68 and 69 to a worm shaft 70 that meshes with a worm gear (not shown) on the shaft of the forming roll 13. By means of a gear shifting device (not shown) forming a part of the speed reducing mechanism 67, it is possible to drive the machine, including the forming roll 13, at varying speeds.

The doctor roll 29 is driven from the shaft of the forming roll 13 through a sprocket and chain mechanism 71. The driven mechanism 71 is so devised as to cause the doctor roll 29 to be driven in the same surface direction but at a considerably slower peripheral speed than the forming roll 13. This arrangement has been found to be particularly effective where the machine is used in the manufacture of sheet or film material of a rubber-wax composition. With the doctor roll revolving at a slower surface speed than the forming roll, the doctor roll functions to smooth or iron out the surface of the film of material on the forming roll 13. This action is augmented by the heated condition of the doctor roll 29 and by the chilled condition of the forming roll 13, since the doctor roll maintains the surface of the material in contact therewith in a molten or plastic state, while the other surface of the material in contact with the forming roll is undergoing hardening.

In forming films from a rubber-wax composition having from about 6 to 15% rubber, we may employ also the apparatus illustrated in Figure 4. The hot composition 91 is sheeted out by a heated stationary doctor blade 92 to which is attached an electrical heating element 93 for maintaining the temperature of the doctor blade suitable for the type of composition used. The sheeted composition is drawn around the chilled roll 94 from which it is stripped and wound up on roll 95. The doctor blade is adjustably positioned from roll 94 so as to produce a film of the desired thickness.

In Figure 5 we illustrate a calender suitable for sheeting out our rubber-wax composition having a rubber content of about 25 to 50% by weight. The apparatus used consists of three superimposed rolls 96, 97, and 98. The upper roll 96 may be heated to a temperature of about 180° F. and coacts with the middle roll which is heated to about 100–110° F. The upper roll 96 is stationary or may revolve very slowly in the same direction as the middle roll so as to doctor the composition 99 supplied thereto. The hot viscous composition is sheeted out between rolls 96 and 97 and then passes around roller 98 where it is chilled to about 50° F. The film is then stripped from roll 98 and wound up on a winding core.

When employing this method of forming a film, it is necessary to carefully control the temperatures of the two top rolls. The top roll should be geared to the proper surface speed to act as a doctor roll and still turn sufficiently fast to roll any specks of dirt or foreign substances in the composition through the nip of the rolls to eliminate tears or slits in the formed film.

We may also form our rubber-wax composition, comprising 50% or more rubber into sheets by using a calendering rolling method employing three superimposed rotating rolls. In such case the upper roll is heated to about 120° F., the middle roll is heated to about 130–135° F. and the lower roll is heated to about 50° F. The composition is rolled between the two upper revolving heated rolls and chilled on the lower roll from which it is then stripped and wound up.

Our composition may also be extruded into self-sustaining sheets as shown in Figure 6. The composition 100 is forced by ram 101 or other suitable means in an extruder 109, through an adjustable extruding orifice 102, and formed into a film 103 which is led over a cooled guide roll 104, supported on a tank 105, into cooling water 106 under a guide roll 107, and out of the tank over guide roll 108. These guide rolls are preferably driven in synchronism with the rate of extrusion of the film. By this method our composition may be extruded into any desired form or shape either in flat sheets of any desired configuration or in hollow tubular form depending upon the type of orifice employed.

We may also form our composition into sheets by means of suitable squeeze rolls as illustrated in Figure 7. The composition 110 is fed to two chilled squeeze rolls 111 and 112 spaced apart so as to produce a sheet of the desired thickness. The film 113 thus formed is then wound up on a core 114.

As previously stated, our preferred composition comprises a mixture of rubber, or a rubber-like substance, in a wax, or wax-like substance. Since compositions of rubber and wax have widely varying viscosities, depending upon the proportions and particular ingredients used and upon the conditions of preparation, we have found it most satisfactory to determine first the permissible viscosities for making the composition into sheet or film material and then to adjust the proportions and conditions so as to obtain viscosities within the permissible range. In general, rubber-wax compositions having viscosities lower than 8000 seconds (50 cc. measured on a Scott viscosimeter at 90° C.) cannot satisfactorily be made up into self-sustaining sheets or films. Ordinarily we prefer to use rubber-wax mixtures having viscosities greatly above this lower limit, such as viscosities of between 300,000 and 1,000,000 secs. (Scott). The upper limit of the permissible viscosity range is too high to be measured satisfactorily on a Scott viscosimeter.

The proportion of pale crepe rubber to paraffin wax may, in general, vary between 6% rubber, 94% paraffin wax and 30% rubber, 70% paraffin wax by weight. Using other rubber-like and wax-like substances the proportions should be so chosen as to give suitable viscosities of at least 8000 secs. (Scott).

The following will illustrate a preferred composition of our invention and a preferred method of preparing the composition:

| | Percent by weight |
|---|---|
| Paraffin wax, melting point between 120 and 180° F. | 85 to 88 |
| Pale crepe rubber sheets, 0.020 to 0.050 inch in thickness | 15 to 12 |

The composition must be prepared under carefully regulated conditions which we have determined by long study and experimentation. The paraffin wax is first melted by heating in a jacketed vessel, preferably provided with a kneader type of stirrer, to a temperature of about 200–210° F. The individual sheets of rubber are then carefully added to the bath so that the surfaces are completely wetted with the molten paraffin as they are being immersed in the bath so as to avoid sticking and welding of the rubber sheets to each other in the bath.

In the case of the lower concentrations of rubber, from 0 to about 15% there is an adequate volume of wax to facilitate good soaking of the rubber. The main precautions involved in effecting a solution of this kind is a careful addition of the rubber as described and correct mixing procedure. Concentrations of from 10 to 15% rubber have a final viscosity sufficient to pull apart soft lumps of rubber which are not properly soaked; concentrations below 10% rubber in wax do not build up such a high viscosity and consequently rigid precaution must be taken to secure proper soaking.

In considering concentrations ranging from 15 to 25% rubber in paraffin wax it is necessary to add the rubber quickly so that the rubber added last will have an adequate chance to soak up its share of the wax. This range of concentrations has a resulting high viscosity which enables the batch to pull apart lumps which would ordinarily cause trouble in lower concentrations.

It is necessary to use another method for mixing rubber and paraffin wax in concentrations above 25% rubber. This method resembles somewhat the present commercial method for compounding rubber. The rubber is "broken down" in the presence of say, an equal weight or less of paraffin wax. This can be done in several types of mixers like the Banbury or the Werner-Pfleiderer. If a lower concentration is desired paraffin wax should be added slowly after the original rubber-wax composition has been thoroughly mixed. This method can also be used for procuring low concentrations of rubber in wax by carefully diluting to the desired composition.

During the addition of the rubber in the specific example of our preferred composition, the temperature of the bath is permitted to drop to 180° to 190° F. and is maintained at this temperature throughout the compounding operations. After all the rubber has been added the bath is gently stirred with a paddle so as to permit thorough penetration of the paraffin into the rubber and to prevent lumping of the rubber during solution. This stirring operation is continued for about fifteen minutes until the rubber sheets are adequately soaked.

The mixture is then stirred mechanically in a kneading type of mixer until the batch is free of lumps of undissolved rubber. This operation requires 1½ to 2 hours and the temperature of the mass is maintained at 180° to 190° F. during the entire period. At the end of this time, any undissolved lumps may be strained out, broken up and returned. However, this is not ordinarily necessary. The composition so prepared is then ready for conversion into films or sheets.

During the compounding operations it is necessary to keep the temperature of the rubber-paraffin wax mixture at about the temperatures indicated in order to avoid overheating, which results in an undesirable darkening of the mass and imparts an odor to it. However, if some slight color and odor are permissible, temperatures up to 200 to 220° F. may be employed. Due recognition should be given to the fact that viscosity of the composition drops if the time of heating is prolonged or if higher temperatures are employed.

Various pigments or other coloring matters, fillers, antioxidants and the like, may be incorporated, either directly or by means of a master batch, into the rubber-wax mixture, depending upon the type of pigment, filler or added ingredient to be incorporated. If a white sheet is desired, a white pigment such as titanium dioxide, or mixtures of titanium dioxide with either calcium sulphate or barium sulphate may be incorporated into the composition.

Three general methods of incorporating additional ingredients have been developed.

First: Certain pigments, fillers and other materials are mixed directly with the paraffin wax in quantities up to, say, several percent by weight, such as aluminum powder, sulphur, sodium salicylate, sodium benzoate, p,p' dioxy-diphenyl cyclohexane (an antioxidant).

Second: Other materials which are not "wetted" so readily by the wax are incorporated into a master batch with solid wax, say in a 50—50 mixture, using a Banbury mixer or ink mill. This is true of such pigments as du Pont Red RL (Schultz Index 189), du Pont Red TX (Schultz Index 189).

Third: Other materials are first incorporated in a rubber-paraffin wax which is then added to a previously prepared rubber-wax composition. In this class may be enumerated the following—

Pigments such as titanium oxide, zinc oxide.

Accelerators such as "du Pont 552", "Zimate".

Antioxidants such as symmetrical di-beta naphthyl-para-phenylenediamine hydroquinone.

The following will serve as an example of our preferred method of incorporating pigment into a rubber-paraffin wax composition, parts by weight being given:

*Example*

A master batch is first prepared in a Banbury mixer, using pale crepe rubber, paraffin wax and a titanium dioxide pigment.

75 parts of pale crepe rubber are placed in the mixing chamber and the ram is held against the rubber for a sufficient time to break it down, in general from 3 to 4 minutes, depending on the temperature of the mixture. The ram is removed and 75 parts of the pigment are added while the mixer is running; the ram is then replaced and the pigment and rubber allowed to mix for another period of about 5 minutes. It is essential that adequate mixing be produced before proceeding with the next step. For example, some pigments will mill into the rubber much more readily than others so that the length of milling time must be determined by the experience of the operator. After the pigment is well dispersed in the rubber, 150 parts of solid paraffin wax are added to the rubber-pigment mixture and the batch is allowed to mix for an additional 5 minutes. During the entire process a stream of cold water is allowed to run through the jacket and the rotors of the mixer to prevent the temperature from rising above, say, 180° F. Before discharging the batch the rubber should be well dispersed in the wax.

For incorporation into the ultimate film forming mixture, the master batch of rubber-wax-pigment (or other material which it may be desirable to incorporate into the batch) should preferably be rolled into a thin sheet. This may then be added to the mixer in which the rubber and wax are being kneaded together. It is possible to use the master batch without sheeting but considerably longer time is taken to secure proper incorporation into the film forming material.

We have found that it is possible to vulcanize our rubber-paraffin wax composition at practically any temperature between say 70° F. and 300° F. However, if such mixtures are vulcanized or even partially vulcanized before being formed into sheets, films or coatings, the entire composition becomes highly viscous and attains a gelled condition so that it cannot be satisfactorily sheeted out or used to coat or laminate fabrics. It is therefore necessary to first form the self-sustaining film and then to vulcanize the composition.

We have found, however, that high vulcanizing temperatures cannot be employed for our films as the film loses its original characteristics and becomes distorted on account of the effect of the high temperature on the composition. It is therefore desirable to vulcanize the films or sheets at low temperatures after being formed. We have found that this can be effected readily by the use of super accelerators which permit self-curing after the film is formed. For this purpose we may use the "split batch" method of compounding our ingredients (although it is also possible to combine all the ingredients in one batch.)

Examples of super accelerators that can be satisfactorily used are the following:

"Butyl zimate"___ A zinc salt of dibutyl dithiocarbamate.
"Zimate"_____Zinc dimethyl dithiocarbamate.
"R-2"_____ The reaction product of carbon bisulphide and methylene dipiperidine.
"ZBX"_____Zinc butyl xanthate.
"552"_____Piperidine pentamethylenedithiocarbamate.

To avoid vulcanization when subjected to the high temperatures required for the film forming operation, two batches are prepared and mixed just before the film is to be formed. The final batch is made in such quantities that it will not gell within the normal operating time for using it up even at the temperatures obtaining in film forming operation. Thereafter, notwithstanding the relatively low temperatures prevailing during the storage of the product, the accelerators are effective in bringing about vulcanization in a period, say, of up to several weeks.

The following example will serve to illustrate our preferred method of making vulcanized sheets, according to which master batches, one containing the sulphur and activator or pigment and the other containing the accelerator, are first made and then proportionate quantities of these master batches are incorporated into split batches, and the split batches mixed just prior to the film forming operation:

*Example*

Two master batches are prepared, one containing the vulcanizing agent and activator, and the other containing the accelerator. Suitable compositions for the master batches are:

| | Per cent |
|---|---|
| Paraffin-wax | 50 |
| Rubber | 25 |
| Added ingredients—sulphur and pigment, or accelerator | 25 |

For convenience the amount of rubber and paraffin wax introduced with the master batches into the final composition is disregarded.

The master batches are prepared in a Banbury mixer in a similar manner previously described for incorporating pigments in rubber-wax compositions.

For incorporation into the ultimate film forming mixture, the master batches should preferably be rolled into a thin sheet. These may then be added to the mixer in which the rubber and wax are being kneaded together. It is possible to use the master batch without sheeting but considerably longer time is taken to secure proper incorporation into the film forming material.

The final batch of rubber-wax composition may suitably have the following proportions by weight of materials:

| | Per cent |
|---|---|
| Accelerator | ½ |
| Sulphur | ½ |
| Zinc oxide | ½ |
| Paraffin-wax (M. P. 130–2° F.) | 83½ |
| Pale crepe rubber | 15 |

To prepare such a composition, two batches of paraffin wax-rubber mixture are prepared each weighing, say 50 lbs. and each containing one half of the wax and rubber to be present in the final batch, in the proportions as shown in the foregoing formula. Then to one batch is added ½ lb. of accelerator, for instance, piperidine pentamethylenedithiocarbamate, in the form of the 25% master batch previously prepared as described; and to the other batch is added ½ lb. of sulphur and ½ lb. of zinc oxide in the form of the 25% master batch containing these agents. Each batch is mixed thoroughly. Equal portions of the two batches are then mixed thoroughly just prior to use in making the film material. It is necessary to convert this composition into films as soon as it is made up as the final mixture will set up or gell to an unworkable condition almost immediately. We have found that as the temperature is raised the gelling rate is increased. After conversion and when kept at room temperature, it will require for from one to two weeks for satisfactory vulcanization to take place.

When a milder cure is desired the proportions of accelerator and vulcanizing agent used are reduced. For example, in the final batch of the aforementioned example, the accelerator may be reduced to ⅛% and the sulphur to ¼%. This freshly prepared composition can be kept at not over 180° F. and used any time within eight to ten hours after it is compounded, without gelling sufficiently to render it unworkable.

When transparency is desired it is preferable to use zinc carbonate instead of zinc oxide in the above composition.

The vulcanized film will shrink in the grain direction much less than the unvulcanized film when subjected to elevated temperatures and will more successfully resist the action of ultra-violet light and will still retain its self-sustaining properties at elevated temperatures. The vulcanized film is also more resistant to solvents than the unvulcanized film. However, the vulcanized film has lost its ability to "heat-seal" to itself to paper and other sheet materials—a property which is desirable for some purposes. These effects may be increased or diminished in degree by controlling the degree of vulcanization.

Antioxidants may be incorporated into our rubber-paraffin-wax composition whether it is to be vulcanized or not. We have found the following antioxidants suitable: hydroquinone, pyrogallol, para-hyroxy-phenyl morpholine, aniline-beta-naphthol.

The addition of the antioxidants, age resistors or photo-chemical inhibitors increases the resistance of the finished sheet or film to the action of light and air.

Where it is desired to make the film more sticky, up to 15% of a gum or resin, such as rosin, may be added to replace an equal weight of wax. Similarly, the gloss may be improved and a harder film produced by the addition of a hydrogenated vegetable oil, such as cottonseed, in amounts up to say, 15% by weight, to replace an equal weight of wax.

During mixing and before the final rubber-paraffin wax batch is ready to be supplied to the film forming machine, it is subjected to a vacuum of 15 to 20 inches of mercury, preferably as high as is practical of attainment, to eliminate air from the batch and to prevent its inclusion in the film.

We have also succeeded in preparing flexible, self-sustaining films from compositions consisting of asphalt and rubber. In preparing such compositions, we may, for example, take 7½ parts by weight of rubber and dissolve same in 42½ parts by weight of paraffin-wax. This mixture is then added to 50 parts by weight of asphalt (Paradura), which has been melted and heated to about 350° F. The composition is intimately mixed and can be formed into a film which is non-tacky and flexible by sheeting out on a chilled forming roller similar to the method used in making films from rubber-wax compositions. The asphalt in its original state is brittle and not flexible but by the addition of the rubber binder to same, it becomes flexible and can be formed into a self-sustaining film.

We have also prepared compositions comprising asphalt and 10% by weight of rubber from which we have formed self-sustaining sheets or films. The tackiness, strength, and flexibility of such sheets is dependent upon the type of asphalt used. By selecting high melting point asphalts, it is possible to produce films which are flexible and non-tacky but when these are desired the time of heating must be carefully controlled.

After much experimentation we have ascertained the important factors which affect the viscosity and adhesiveness of our composition as well as the characteristics of the final product. These factors must be carefully controlled and coordinated in order to produce uniform results. The production of compositions having a predetermined viscosity is therefore an important feature of our invention as the proper film forming characteristics of our composition are determined thereby.

As previously stated we have found that rubber-wax compositions having viscosities lower than 8000 seconds (50 cc. measured on a Scott viscosimeter at 90° C.) cannot satisfactorily be made up into self-sustaining sheets. Ordinarily we prefer to use rubber-wax mixtures having viscosities greatly above this lower limit, such as viscosities of between 300,000 and 1,000,000 seconds (Scott). The upper limit of the permissible viscosity range is too high to be measured satisfactorily on a Scott viscosimeter.

We have also found that the tensile strength and stretch of the film are closely related to the viscosity of the composition, increasing with the increased viscosity of the mixture used for film formation.

We have found furthermore the following factors are important to control in our invention: (1) selection of suitable body substance and binder; (2) proper proportions of these substances; (3) the temperature of compounding; (4) the time of compounding; (5) the physical characteristics of the binder used; (6) the character of agitation of the ingredients; (7) the effect of other added ingredients. These factors must be properly controlled and coordinated in order to produce uniform results.

We have previously discussed the selection of suitable thermoplastic substances and their proportions. As the proportion of the binder, such as rubber, is increased in our composition, the viscosity of the composition will increase in proportion and the tensile strength of the product is also increased.

As the amount of binder is increased in the mixture the time of heating for producing a predetermined viscosity is increased. The stretch of rubber-wax films, for example, made from mixtures having the same viscosity, but having different amounts of rubber, increases with the rubber content of the mixture.

The temperature of compounding for our preferred wax-rubber composition is 180° to 190° F. but continued heating at this temperature will cause lower viscosity, discoloration and odor. As the temperature is increased, the viscosity is lowered more rapidly in a given time. Heating of our rubber-wax composition for periods above, say, ten hours at 180° to 190° is undesirable as it causes discoloration and odor.

We have found that with a given concentration of pale crepe rubber in wax, the viscosity at a given temperature is inversely proportional to the temperature to which the mixture has been heated during or after the solution period. For instance, the effect of temperature on the viscosity of a solution of 6% pale crepe rubber in paraffin-wax was determined by quickly heating the mixture to a given temperature and holding at that temperature for one hour, with the following results:

| Temperature (1 hour) | Viscosity (Scott at 90° C. 50 cc.) |
| --- | --- |
| 150° F. | 12000 |
| 250° | 6500 |
| 300° | 1000 |

In preparing our rubber-wax composition, it is desirable to carry out the operations in the minimum time necessary to effect complete solution of the rubber in the wax to produce a uniform composition. In prolonging the time of compounding the viscosity is lowered. This also causes a decrease in the tensile strength of the product. Inasmuch as in our preferred composition the mixture is maintained at a temperature of 180 to 190° F. prolonged heating causes discoloration and odor in the mixture.

With given proportions the time of compounding a uniform mixture is determined by the thickness of the rubber sheets used, the temperature of compounding and character of agitation. An increase in the thickness of the rubber sheets used will increase the time of solution. By increasing the temperature the time of compounding is reduced, but as previously pointed out, too high temperatures cannot be employed.

Inasmuch as the rate of solution of the rubber sheets is dependent on the area of rubber subjected to the action of the molten paraffin, the physical formation of the rubber sheets is also an important factor. A thin sheet of pale crepe rubber, for example, contains many spaced small nodules of rubber. In soaking this sheet in a paraffin bath, the paraffin penetrates the spaces between the nodules causing more rapid solution of the rubber than would occur if there were no spaces as in smoked sheet rubber.

We have found that the thickness of the rubber sheets used is important because the thinner the sheets of rubber used, the less time is required to dissolve the rubber. For example, in compounding 15% rubber by weight in paraffin-wax (M. P. 130° F.) at 180° F. using a kneader mixer, the rubber used being bandage pale crepe sheets of 0.015 to 0.020 inch thickness, the time for obtaining complete solution is about one hour. When using a grade of rubber known as RCMA pale crepe rubber sheets having a thickness of 0.030 to 0.040 inch, the time of solution is 1½ to 2 hours under the same conditions. Regular pale crepe having 0.060 to 0.070 inch thickness requires about four hours or more for complete solution under the same conditions. The thickness of the rubber sheets used thus determines the time of compounding which must be carefully controlled and co-ordinated with the other factors mentioned.

We have found that it is important to regulate the character of agitation in preparing the rubber and paraffin mixture. Any suitable means may be used for this purpose such as a kneading type of mixer or ordinary rubber cement mixer. The mixer should be operated so as to effect the complete dispersion of the rubber in the minimum time without substantially breaking down the internal structure of the rubber aggregates in order to avoid reducing the final viscosity below the desired limits. The time of compounding will, of course, be dependent on the type of mixer used.

Continuous mechanical stirring of a rubber-wax composition during heating reduces the viscosity as compared with the viscosity of the same composition when stirred only occasionally under the same conditions.

The effect of adding other specific ingredients, such as accelerators, pigments or fillers, to the body and binder of our composition must be considered in relation to the viscosity and desired characteristics of the final product and properly compensated for by varying the other mentioned factors. The effect of some added ingredients may be to lower the viscosity while other added ingredients may increase the viscosity. For example—additional viscosity may be obtained over that of pure paraffin wax alone by the addition to paraffin of other materials such as aluminum stearate, but the resultant mixture does not have as good adhesiveness nor moistureproofness as a rubber-paraffin wax mixture of equal viscosity.

The properties of our composition and product are thus entirely dependent upon the proper control of the aforementioned factors which must be carefully coordinated and adjusted for each composition.

In starting up the sheet or film forming operation on the apparatus of this invention as illustrated in Figures 1 and 2, for example prepared rubber-wax composition in a heated, viscous condition is charged into the hopper liner 23. Hot water is circulated through the hopper jacket 22 to maintain the thermoplastic mass at the proper temperature and therefore at the proper viscosity. A temperature of 180° F. and over may be used, but if color and odor are to be avoided, the temperature of the mass should be maintained at not over 180° F. The doctor roll is also heated, as by passing hot water through it, or, if desired, saturated steam can be used in both the hopper jacket and the doctor roll. A cooling medium, such as cold water or a brine solution, is circulated through the forming roll 13 to maintain the temperature of the roll at around 40 to 50° F. or less.

When using rubber-wax compositions containing about 15% rubber, the doctor roll 29 is preferably revolved at a speed considerably slower than that of the forming roll 13. As indicative of the relative speeds of the two rolls, we find that if the doctor roll is revolved at a surface speed up to about 15% of the surface speed of the forming roll, very satisfactory results are obtained when using the aforementioned composition. If the relative speed of the doctor roll is increased above this ratio, we find that the smoothness of the film is impaired and that ridges are formed on the surface.

One of the objects of having the doctor roll 29 revolve is that occasionally lumps of undissolved rubber or small specks of dirt may collect between the doctor roll 29 and the forming roll 13. If the doctor roll 29 were not turning, these lumps or particles of dirt would remain in situ, thereby causing the film to slit or tear at such point. If, however, the doctor roll 29 turns, the wiping action is sufficient to keep such dirt or lumps of rubber moving along with the film. The faster the doctor roll turns, the sooner the particles are carried away and so reduce the slits or tears in the sheet to a minimum length.

The plate 38 is adjusted to give the proper clearance between the tapered edge of said plate and the doctor roll 29 and forming roll 13. Similarly, the clearance between the doctor roll 29 and the surface of the forming roll 13 is adjusted to give the desired thickness of film on the forming roll. As the thermoplastic material passes through the orifices thus provided, the surface in contact with the doctor roll 29 is kept in heated plastic condition, while the surface in contact with the forming roll 13 is rapidly chilled and hardened. The time of contact of the thermoplastic material with the surface of the forming roll 13 prior to passing under the doctor roll 29 is determined by the setting of the adjustable plate 38. It is desirable to set one side of the film against the forming roll 13 and still have the opposite side sufficiently flowable so that it will be smoothed out by the heated doctor roll 29. In general, we find that a cylindrical, or rounded doctor surface, such as that of the doctor roll 29, gives better results than a straight edge doctor, or a stationary doctor with a rounded edge if there are any foreign dirt particles in the prepared composition because the straight or rounded edge stationary doctors will not eliminate the specks of dirt that get into the sheet and cause tearing of the film. However stationary doctors may be used satisfactorily if the composition is free of foreign dirt particles. These foreign particles, if present, may be removed from the composition by screening or any other suitable method.

After the film of thermoplastic material has built up on the surface of the forming roll 13 to the desired thickness and possesses the necessary physical characteristics to enable it to be stripped from the roll, it is stripped manually from the surface of the forming roll and led under stripper roll 86 over the driven roll 49, under roll 89 and to the winding mechanism 12, where the end of the film is started around a core placed on the winder shaft 51. The operation of the winder shaft 51 is, of course, synchronized to the speed of the machine so that the film material can be wound up into a roll under proper tension and without breaking.

The sheet or film material thus obtained is particularly adapted for wrapping purposes. When formed from a rubber-wax composition of the type described, the sheet or film material is practically moistureproof and waterproof and, if not vulcanized, has excellent heat sealing properties without being tacky at ordinary room or atmospheric temperatures. The sheet or film material may be either semi-transparent or opaque, depending upon whether pigments or fillers are incorporated into the composition or not.

A more transparent film will be obtained, other conditions being the same, if the sheet or film is chilled very rapidly on the forming roll. For that reason the surface temperature of the roll should be kept as low as is practical, say down to 35° F. or even less. Not only is the transparency and gloss of the sheet improved by this sudden cooling, but the flexibility, tensile strength, stretch and its resistance to the passage of water vapor are also greatly improved.

The construction and arrangement of our machine is such that the thermoplastic material can be formed directly into sheets or films in a continuous manner and without the necessity of using volatile solvents and of providing for solvent recovery. The machine of this invention is capable of forming sheets from a rubber-wax composition having a thickness of as little as 0.004 inch, or even less, and of maintaining this thickness uniformly throughout the width of the sheet during continuous operation.

Where viscosity is expressed in the claims, it will be understood as having been determined on a Scott viscosimeter at 90° C. by measuring the time in seconds required for a flow of 50 cc. of the composition through the instrument.

The term "rubber" as used in the appended claims is intended to include the use of india rubber (such as pale crepe rubber and smoke sheet rubber), gutta rubber, synthetic rubber or other artificially produced gummy substances which are suitable for the purpose of this invention, singly or mixtures thereof.

The term "wax" as used in the appended claims is intended to include the use of paraffin-wax, beeswax, spermaceti, candelilla, carnauba and their natural or synthetic equivalents, or mixtures thereof, suitable for the purpose of this invention.

The term "asphalt" as used in the appended claims is intended to include asphalts which are solid, brittle and not flexible under normal conditions.

We are aware that changes may be made and many details of our invention may be varied through a wide range without departing from the essential principles thereof, and we therefore do not purpose limiting the patent granted hereon otherwise than is necessitated by the prior art.

We claim as our invention:

1. The continuous method of making flexible, self-sustaining sheet material from a thermoplastic composition, which comprises the steps of compounding a composition comprising a body and a binder so as to impart thereto a viscosity of at least 8000 secs. (Scott viscosimeter at 90° C.), said body comprising a substance selected from the group consisting of wax and asphalt, said binder comprising a substance selected from the group consisting of india rubber, gutta rubber, synthetic rubber and rubber-like substances, feeding the said composition at a regulated rate onto a traveling chilled surface, doctoring the composition by applying thereto a heated surface maintained in closely spaced relation to said chilled surface to form a film of said composition of the desired thickness and stripping said film from said chilled surface.

2. The continuous method of making flexible, self-sustaining sheet material from a composition comprising rubber and asphalt, which comprises the steps of compounding a composition comprising rubber and asphalt so as to impart thereto a viscosity of at least 8000 secs. (Scott viscosimeter at 90° C.), feeding the said composition at a regulated rate onto a traveling chilled surface, doctoring the composition by applying thereto a heated surface maintained in closely spaced relation to said chilled surface to form a film of said composition of the desired thickness and stripping said film from said chilled surface.

3. The continuous method of making flexible, self-sustaining sheet material from a composition comprising rubber and wax which comprises the steps of compounding a composition comprising rubber and wax so as to impart thereto a viscosity of at least 8000 secs. (Scott viscosimeter at 90° C.), feeding the said composition at a regulated rate onto a traveling chilled surface, doctoring the composition by applying thereto a heated surface maintained in closely spaced relation to said chilled surface to form a film of said composition of the desired thickness and stripping said film from said chilled surface.

4. The continuous method of making flexible, self-sustaining sheet material from a composition comprising rubber and wax which comprises the steps of compounding a composition comprising rubber and wax so as to impart thereto a viscosity of at least 8000 secs. (Scott viscosimeter at 90° C.), feeding the said composition at a regulated rate onto a traveling chilled arcuate surface, doctoring the composition by applying thereto a heated arcuate surface maintained in closely spaced relation to said chilled surface to form a film of said composition of the desired thickness and stripping said film from said chilled surface.

5. The continuous method of forming flexible, self-sustaining sheet and film material from a composition comprising rubber and wax, which comprises the steps of compounding a composition comprising rubber and wax so as to impart thereto a viscosity of at least 8000 secs. (Scott viscosimeter at 90° C.), feeding said composition in a heated condition onto a chilled revolving surface, causing said composition to be drawn between said chilled surface and a closely spaced heated surface revolving in the same direction but at a slower speed, to thereby form a film of the desired thickness, and stripping said film from said chilled surface.

6. The continuous method of forming flexible, self-sustaining sheet and film material from a composition comprising rubber and wax which comprises the steps of compounding a composition comprising rubber and wax so as to impart thereto a viscosity of between 300,000 and 1,000,000 secs. (Scott viscosimeter at 90° C.), feeding said composition in a heated condition onto a chilled revolving surface, causing said composition to be drawn between said chilled surface and a closely spaced heated surface revolving in the same direction but at a slower speed, to thereby form a film of the desired thickness, and stripping said film from said chilled surface.

7. The continuous method of making flexible, self-sustaining sheet material from a composition comprising 6 to 30% by weight of pale crepe rubber and paraffin-wax, which comprises the steps of compounding a composition comprising 6 to 30% by weight of pale crepe rubber and paraffin-wax so as to impart thereto a viscosity of at least 8000 secs. (Scott viscosimeter at 90° C.), feeding the said composition at a regulated rate onto a traveling chilled surface, doctoring the composition by applying thereto a heated surface maintained in closely spaced relation to said chilled surface to form a film of said composition of the desired thickness and stripping said film from said chilled surface.

8. The continuous method of forming flexible, self-sustaining sheet and film material from a composition comprising rubber and wax, which comprises the steps of compounding a composition comprising rubber and wax so as to impart thereto a viscosity of at least 8000 secs. (Scott viscosimeter at 90° C.), feeding said composition in a heated condition onto a chilled revolving surface, causing said composition to be drawn between said chilled surface and a closely spaced heated surface revolving in the same direction at a surface speed up to about 15% slower than the surface speed of said chilled surface, to thereby form a film of the desired thickness, and stripping said film from said chilled surface.

ALLEN ABRAMS.
CHARLEY L. WAGNER.